United States Patent [19]

Kanngiesser

[11] 3,952,210

[45] Apr. 20, 1976

[54] GROUNDING OF A DOUBLE-POLE HIGH VOLTAGE-DIRECT CURRENT-TRANSMISSION SYSTEM

[75] Inventor: Karl Werner Kanngiesser, Viernheim, Germany

[73] Assignee: Brown, Boveri & Cie AG, Mannheim, Germany

[22] Filed: Dec. 4, 1974

[21] Appl. No.: 529,268

[30] Foreign Application Priority Data
Dec. 6, 1973  Germany............................ 2360783

[52] U.S. Cl................................ 307/82; 321/27 R; 307/94
[51] Int. Cl.² .......................................... H02H 1/02
[58] Field of Search ................. 307/92, 147, 95, 82, 307/94; 321/27 R; 317/27 R, 29 R, 103

[56] References Cited
UNITED STATES PATENTS
3,454,783  7/1969  Hunt..................................... 307/94

OTHER PUBLICATIONS
Lacy, DC Power Transmission, "Electronics World", May 1968, pp. 42–43, 69.

Primary Examiner—Robert K. Schaefer
Assistant Examiner—M. Ginsburg
Attorney, Agent, or Firm—Herbert L. Lerner

[57] ABSTRACT

A double-pole high-voltage direct-current transmission system is provided with two stations and an overhead line or cable, each of the stations having rectifier bridges connected in series from a positive line pole to a ground electrode and from the ground electrode to a negative line pole. The ground or earth serves as return line if one of the line poles should fail. The ground electrode at one of the stations is a depth electrode regularly operated as an anode, and the ground electrode at the other of the stations is regularly operated as a cathode. Two pairs of reversing switches are provided, each of the pairs, when the other of the stations is operated as a rectifier, being connected on the direct-current side of and to the respective rectifier bridges located between the negatively operated line pole and the depth electrode, on the one hand, and between the negatively operated line pole and the ground electrode operated as a cathode, on the other hand.

2 Claims, 4 Drawing Figures

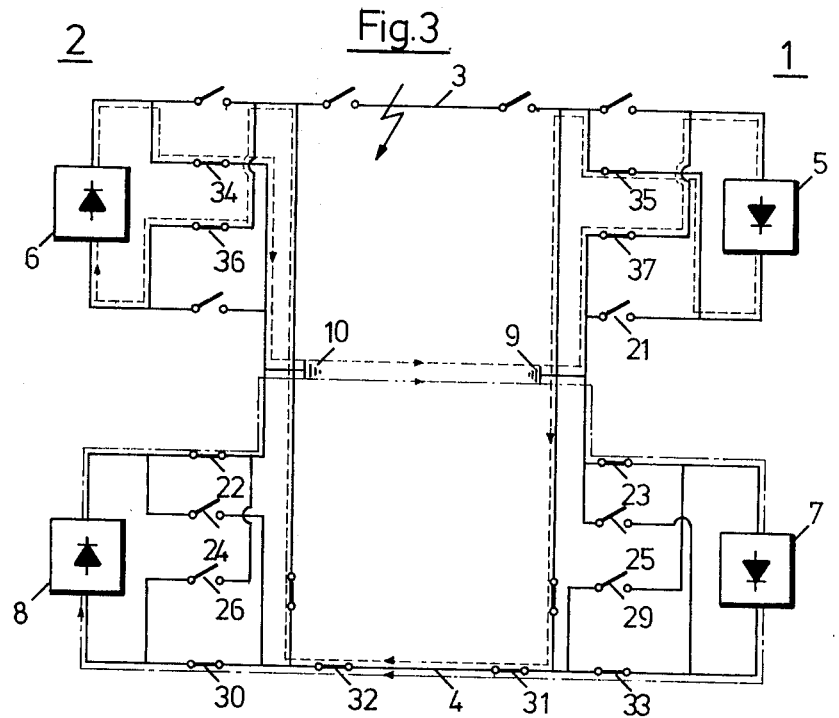
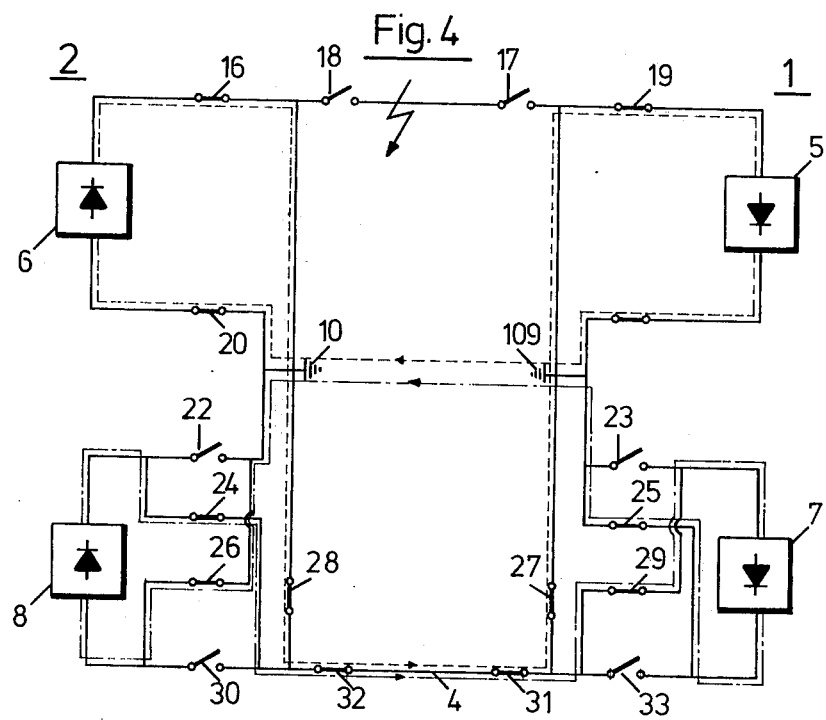

GROUNDING OF A DOUBLE-POLE HIGH VOLTAGE-DIRECT CURRENT-TRANSMISSION SYSTEM

The invention relates to a double-pole high-voltage direct-current transmission system with two stations and an overhead line or cable, each station having rectifier bridges connected in series from positive pole to ground electrode, and from ground electrode to negative pole, the earth thereby serving as return line if one of the line poles should fail.

In principle, such a system is a direct-current, three-conductor system, two of the conductors (positive and negative poles) being in the overhead line or cable, and the earth being the third conductor (Bull. SEV 58, 1967, 2, 21. Jan., S. 63). In normal operation, the high-voltage direct-current transmission system is symmetrically operated i.e. no current flows in the earth. However, if one pole should fail, for example, due to broken cable, then the high-voltage direct-current transmission system can be operated with a single pole and with the earth as the return conductor. With the operation taking place over the ground electrodes, the problem of electro-osmosis arises. This means that groundwater present in the soil is attracted by the cathodically operated ground electrode, and is, on the other hand, repelled by the anodically operated ground electrode. The latter case is critical because it leads to results in drying out of the soil and thereby to an increase in the transfer resistance.

In heretofore known high-voltage direct-current transmission systems, each station has four polarity-reversing switches (German Published Non-Prosecuted Applications DT-OS 2,142,057 and DT-OS 2,142,058). If a failure should occur, a switching program is begun in a conventional manner which cuts out the defective line and switches the rectifiers associated with the defective line into a circuit parallel to the properly functioning remaining half of the rectifiers. Automatically, the transmission continues with the same polarity as that which the sound or undamaged circuit portion had had before. The current direction can then also automatically reverse in the earth.

Beginning from a system mentioned in the introduction hereto, it is an object of the invention of the instant application to provide a double-pole high-voltage direct-current transmission system, the operation of which is maintainable with half the output in case of the failure of a line pole and with marked exclusion or elimination of the effect of electro-osmosis. It is also an object of the invention to effect the necessary switching to accomplish the foregoing objective in the event of failure, by relatively simple means and at minimal cost.

With the foregoing and other objects in view, there is provided in accordance with the invention, in a double-pole high-voltage direct-current transmission system with two stations and an overhead line or cable, each of the stations having rectifier bridges connected in series from a positive line pole to a ground electrode and from the ground electrode to a negative line pole, whereby the ground or earth serves as return line if one of the line poles should fail, the ground electrode at one of the stations being a depth electrode regularly operated as an anode, and the ground electrode at the other of the stations being regularly operated as a cathode, and two pairs of reversing switches each of the pairs, when the other of the stations is operated as a rectifier, being connected on the direct-current side of and to the respective rectifier bridges located between the negatively operated line pole and the depth electrode, on the one hand, and between the negatively operated line pole and the ground electrode operated as a cathode, on the other hand.

Obviously, it is equally within the scope of the invention that when the direction of energy flow changes i.e. when the second or other station is operated as a current inverter, each of the pairs of reversing switches are connected on the direct-current side of and to the respective rectifier bridges located between the then positively operated line pole and the depth electrode, on the one hand, and between the positively operated line pole and the ground electrode operated as a cathode, on the other hand.

A decisive advantage results from the foregoing features and novel connection of the electrodes, according to the invention, namely that for single-pole operation, current flow direction in the earth is predetermined. In heretofore known double-pole high-voltage direct-current transmission systems, such an effect is produced only if a specific one of the two line poles fails. If the other of the two poles should fail, however, then a reversal of current flow direction in the earth would take place.

The effect of electro-osmosis is not insignificant if a conventional depth electrode (Tiefenelektrode) is provided as the ground electrode which is regularly operated as the anode. Since the aforementioned features of the electrodes and the connection or assembly of the polarity reversing switches on the direct-current side is interchangeable from system to system, it can be expected that, at least at one end of the double-pole high-voltage direct-current transmission system, well-conducting ground or earth, such as ore or coal seams, for example, will be present at a given depth, so that a good i.e. low, transmission or transfer resistance will be attained without the presence of ground water.

A further advantage of the invention of this application is that only the rectifier bridges of one pole are provided with the polarity reversing switches at the direct-current side in a manner heretofore known from the aforementioned German Published Non-Prosecuted Patent Application, so that in the event of a failure of the other pole, the polarity is changed and the required current direction is thereby re-established.

As mentioned hereinbefore, the invention of this application thus takes electro-osmosis into account and, in fact, advantageously.

Although the invention is illustrated and described herein as embodied in grounding of a double-pole high-voltage direct-current transmission system, it is nevertheless not intended to be limited to the details shown, since various modifications and structural changes may be made therein without departing from the spirit of the invention and within the scope and range of equivalents of the claims. The construction and method of the invention, however, together with additional objects and advantages thereof will be best understood from the following description of specific embodiments when read in connection with the accompanying drawings, in which:

Figure 2:
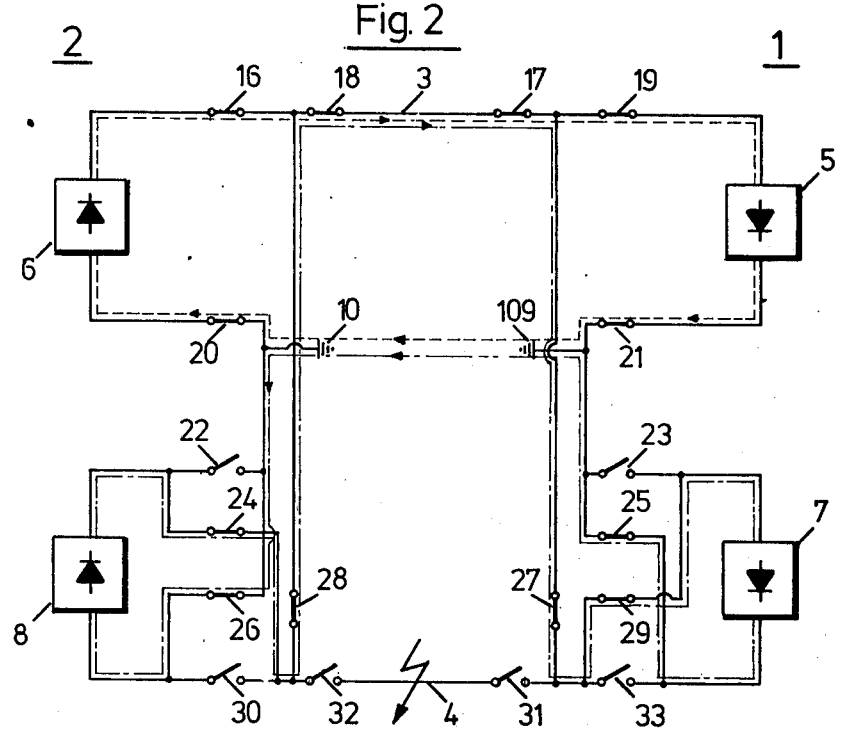
FIG. 2 is a simplified schematic diagram of a high-voltage direct-current transmission system according to the invention with polarity reversing switches, shown in a condition in which the negative transmission or line pole has failed.

FIG. 3 is a schematic diagram of a corresponding prior art system to that of the inventive system of FIG. 2 wherein failure of the positive transmission or line pole has occurred; and FIG. 4 is a schematic circuit diagram of the high-voltage direct-current transmission system according to the invention as shown in FIG. 2 in a condition, however, resulting from the failure of the positive transmission or line pole instead of the negative pole.

Figure 1:
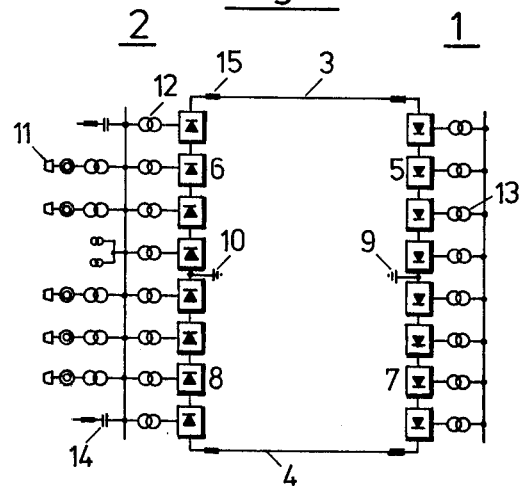
FIG. 1 is a basic schematic diagram of a double-pole high-voltage direct-current transmission system as known in the art.

Referring now to the drawing and first, particularly, to FIG. 1 thereof, there is shown, as an example, a schematic circuit diagram of the heretofore known high-voltage direct-current transmission system that is being constructed between Cabora Bassa and Apollo. In this known case, a first station 1 is a receiving station and a second station 2 is a sending or transmitting station. A transmissin line 1,400 km long with a positive line pole 3 and a negative line pole 4 is located between the two stations 1 and 2. Each station 1, 2 contains bridges 5 and 7, on the one hand, and 6 and 8, on the other hand, of thyristors, which are connected in series between a respective transmission or line pole 3, 4 and respective ground electrodes 9 and 10. Power plant installations 11, transformers 12 and 13, filters 14 and smoothing choke coils 15 constitute other important components of the high-voltage direct-current transmission system.

In FIGS. 2, 3 and 4, the same reference numerals are used to identify like elements. According to the invention, in the embodiment of the invention shown in different phases for FIG. 2 and FIG. 4, the electrode of the station 1 is constructed as a conventional depth electrode 109 and is operated anodically on a regular basis. In addition, switches 16 to 33 are provided which are activated by a conventional control device having a switching program. The control device may be of any known type and is not illustrated because its specific construction forms no part of the invention of this application. Of the switches illustrated in FIGS. 2 and 4, switches 24 and 26, on the one hand, and 25 and 29, on the other hand, are the polarity reversing switches associated with each station 1 and 2 and, in fact, the even-numbered reversing switches to the station 2 and the odd-numbered reversing switches to the station 1.

If a conduction or line failure should occur in the negative transmission or line pole 4, the defective line is then cut off and the rectifier bridges 7 and 8 associated therewith are switched to the sound or undamaged positive transmission or line pole 3. The current through the bridges 5 and 6 is illustrated by a broken line formed of successive dashes and travels in direction of the arrow heads associated therewith, the current through the bridges 7 and 8 by a dot-dash line with suitable arrowheads indicating flow direction. The switches 16 to 21, the polarity reversing switches 24, 26, 25 and 29, according to the invention, and the switches 27 and 28 are closed while the remaining switches 22, 23, 30 and 33 are opened. In the event of failure in the positive transmission line pole 3, the only change in the phase shown in FIG. 4 over that shown in FIG. 2 is that the closed switches 17 and 18 of FIG. 2 are open in FIG. 4, and the open switches 31 and 32 in FIG. 2 are closed in FIG. 4.

In the switch-over which occurs in the case of a failure in the positive transmission line pole 3, of heretofore known transmission systems of this general type, additional polarity reversing switches 34, 35, 36 and 37 are required as shown in the circuit diagram of such a prior art transmission system illustrated in FIG. 3.

As mentioned hereinbefore, it is clearly understood that, in a high-voltage direct-current transmission system according to the invention, an energy reversal can take place i.e. a transmission from the station 1 to the station 2 can be effected. Moreover, the anodically operated depth electrode can be coordinated or associated with the particular station at which more favorable ground or soil conditions prevail, when constructing the high-voltge direct-current transmission system.

I claim:

1. In a double-pole high-voltage direct-current transmission system with two stations and an overhead line, each of the stations having rectifier bridges connected in series from a positive line pole to a ground electrode and from the ground electrode to a negative line pole, whereby the earth serves as return line if one of the line poles should fail, the ground electrode at one of the stations being a depth electrode regularly operated as an anode, and the ground electrode at the other of the stations being regularly operated as a cathode, and two pairs of reversing switches, each of said pairs, when the other of the stations is operated as a rectifier, being connected on the direct-current side of and to the respective rectifier bridges located between the negatively operated line pole and the depth electrode, on the one hand, and between the negatively operated line pole and the ground electrode operated as a cathode, on the other hand.

2. Transmission system according to claim 1 wherein, when the other of the stations is operated as a current inverter, said pairs of reversing switches are connected on the direct-current side of and to the respective rectifier bridges located between the positively operated line pole and said depth electrode, on the one hand and between the positively operated line pole and said ground electrode operated as a cathode on the other hand.

* * * * *